(12) United States Patent
Goldberg

(10) Patent No.: US 11,464,360 B2
(45) Date of Patent: Oct. 11, 2022

(54) COMBINATION APPLIANCE AND METHODS OF USE

(71) Applicant: Stephen J. Goldberg, Wilmington, DE (US)

(72) Inventor: Stephen J. Goldberg, Wilmington, DE (US)

( * ) Notice: Subject to any disclaimer, the term of this patent is extended or adjusted under 35 U.S.C. 154(b) by 26 days.

(21) Appl. No.: 16/286,893

(22) Filed: Feb. 27, 2019

(65) Prior Publication Data
US 2019/0282029 A1   Sep. 19, 2019

Related U.S. Application Data

(60) Provisional application No. 62/612,497, filed on Dec. 31, 2017.

(51) Int. Cl.
*A47J 37/06*   (2006.01)
*A47J 37/08*   (2006.01)
(Continued)

(52) U.S. Cl.
CPC ............. *A47J 37/0629* (2013.01); *A23L 5/15* (2016.08); *A47J 36/32* (2013.01); *A47J 37/0664* (2013.01);
(Continued)

(58) Field of Classification Search
CPC ....... A24F 1/30; C03B 29/02; C03C 17/3417; C03C 17/36; C03C 17/3605; C03C 17/3686; C03C 2218/365; C07K 14/005; C07K 2319/40; C07K 2319/42; C12N 2730/10151; C12N 2830/006; C12N 2730/10122; F27B 17/0083; F27D 11/02;
(Continued)

(56) References Cited

U.S. PATENT DOCUMENTS 3,823,658 A * 7/1974 Pinchot ............... A47J 37/0688
99/340
4,866,572 A * 9/1989 Blodgett ................. A47J 47/14
62/331
(Continued)

OTHER PUBLICATIONS

Waring Pro WTO 150 Toaster Oven, https://www.consumerreports.org/products/toaster-oven/waring-pro-wto150-229083/overview/.
(Continued)

*Primary Examiner* — Tu B Hoang
*Assistant Examiner* — Vy T Nguyen
(74) *Attorney, Agent, or Firm* — McCarter & English, LLP

(57) ABSTRACT

Exemplary embodiments are directed to a combination appliance. The combination appliance includes a first appliance and a second appliance. The first appliance includes a front surface, a rear surface, side surfaces extending between the front and rear surfaces, and at least one heating chamber. The second appliance includes a front surface, a rear surface, side surfaces extending between the front and rear surfaces, a heating chamber, and a door at the front surface of the second appliance. The first appliance is vertically disposed over the second appliance with the front, rear and side surfaces of the first and second appliances substantially aligned. A width of the combination appliance defined by the front surface of the first and second appliances is dimensioned smaller than a depth of the combination appliance defined by the side surfaces of the first and second appliances.

16 Claims, 13 Drawing Sheets

(51) Int. Cl.
*A47J 36/32* (2006.01)
*A23L 5/10* (2016.01)

(52) U.S. Cl.
CPC ....... *A47J 37/0878* (2013.01); *A23V 2002/00* (2013.01)

(58) Field of Classification Search
CPC ......... F27D 1/0036; F27D 7/04; G04G 21/02; G04G 21/04; G04G 21/08; G04G 99/006; G04G 9/0064; G06F 1/163; G06F 3/017; G06F 3/0346; G06F 3/04817; G06F 3/0482; G06F 3/04845; G06F 3/04847; G06F 3/04883; G06F 3/14; H01C 17/003; H01C 17/28; H01R 13/73; H04L 51/18; H04L 51/32; H04L 67/10; H04L 67/125; H04L 67/30; H04L 67/306; H04L 67/34; H04M 1/7253; H04M 1/72533; H04M 1/72566; H04M 2250/22; H04W 4/12
USPC ....... 219/386, 392, 401, 411, 405, 412, 428, 219/521, 385, 414, 492, 391, 396, 397, 219/398, 400, 408, 483, 486, 494, 524, 219/395, 402, 404, 409, 451.1, 452.11, 219/481, 490, 497, 506; 99/357, 339, 99/327, 389, 391, 331, 340, 385, 393, 99/448, 328, 332, 446, 329 P, 329 RT, 99/334, 342, 348, 365, 374, 375, 377, 99/378, 379, 384, 390, 400, 444, 450, 99/476, 483; 126/1 R, 19 M, 214 D, 126/273 R, 37 R, 41 R; 392/407, 416, 392/418; 426/523, 233, 418, 466, 520
See application file for complete search history.

(56) References Cited

U.S. PATENT DOCUMENTS

| | | | |
|---|---|---|---|
| 5,694,831 A | 12/1997 | Haroun | |
| 6,116,150 A | 9/2000 | Greenfield, Jr. | |
| 6,543,338 B2 | 4/2003 | Chasen | |
| 7,005,616 B2* | 2/2006 | Kim | A47J 37/0676 99/357 |
| 7,105,778 B1* | 9/2006 | DeLong | A47J 37/0635 219/386 |
| 9,743,795 B2* | 8/2017 | Chen | A47J 27/122 |
| 9,756,981 B2 | 9/2017 | Fung | |
| 9,959,728 B2 | 5/2018 | True | |
| 2002/0043529 A1* | 4/2002 | Pickering | A47J 37/0629 126/211 |
| 2004/0262288 A1* | 12/2004 | Kim | A47J 37/0688 219/451.1 |
| 2006/0016804 A1* | 1/2006 | Greenburg | H05B 6/64 219/679 |
| 2006/0107847 A1* | 5/2006 | Kissel, Jr. | A47B 51/00 99/484 |
| 2006/0182862 A1* | 8/2006 | Ely | A47J 37/0871 426/523 |
| 2008/0173185 A1* | 7/2008 | Lam | A47J 37/0871 99/339 |
| 2014/0263269 A1* | 9/2014 | Veltrop | A47J 39/02 219/394 |
| 2015/0359046 A1 | 12/2015 | Mohseni | |
| 2016/0029829 A1 | 2/2016 | Klein | |
| 2017/0290454 A1* | 10/2017 | Hall | A23L 5/10 |

OTHER PUBLICATIONS

Hamilston Beach Toastation Toaster & Oven, Model 22720, https://www.hamiltonbeach.com/toastation-toaster-and-oven-22720.

* cited by examiner

COMBINATION APPLIANCE AND METHODS OF USE

CROSS-REFERENCE TO RELATED APPLICATIONS

This application claims the benefit of U.S. Provisional Patent Application No. 62/612,497, which was filed on Dec. 31, 2017. The entire content of the foregoing provisional patent application is incorporated herein by reference.

TECHNICAL FIELD

The present disclosure relates to an appliance and, in particular, to a combination appliance including a toaster and a toaster oven disposed in a vertical or stacked configuration.

BACKGROUND

Conventional toasters and toaster ovens are common appliances in a kitchen environment, and can be used for toasting food such as breads, bagels and pastries, or alternatively, for baking or heating foods such as casseroles. These toasters and toaster ovens are typically provided as separate appliances, requiring countertop space not only for storage of the appliances, but also sufficient countertop space in front of the toaster oven to open the toaster oven door to access its contents. Combination appliances having a toaster and toaster oven typically include a front width defined by the toaster oven door dimensioned significantly greater than the depth of the appliance, resulting in a necessity of greater countertop space in front of the toaster oven to access its contents. Such combination appliances, when stacked in a vertical configuration, generally share a heating chamber for their respective operations.

Thus, a need exists for a combination appliance that is configured to reduce the amount of countertop space in front of the appliance, and a combination appliance having separate heating chambers for the toaster and toaster oven allowing independent use. These and other needs are addressed by the appliance of the present disclosure.

SUMMARY

In accordance with embodiments of the present disclosure, an exemplary combination appliance is provided. The combination appliance includes a first appliance and a second appliance. The first appliance includes a front surface, a rear surface, side surfaces extending between the front and rear surfaces, and at least one heating chamber. The second appliance includes a front surface, a rear surface, side surfaces extending between the front and rear surfaces, a heating chamber, and a door at the front surface of the second appliance. The first appliance is vertically disposed over the second appliance with the front, rear and side surfaces of the first and second appliances substantially aligned. A width of the combination appliance defined by the front surface of the first and second appliances is dimensioned smaller than a depth of the combination appliance defined by the side surfaces of the first and second appliances.

The first appliance can be a toaster assembly, and the second appliance can be a toaster oven assembly. In some embodiments, the first appliance and the second appliance are independently removable from a housing of the combination appliance (e.g., a modular or interchangeable housing design). In some embodiments, the depth of the combination appliance can be at least two times greater than the width of the combination appliance. In some embodiments, the width of the combination appliance can be between about half to about three-quarters size of the depth of the combination appliance.

The toaster assembly includes two slots formed in a top surface of the toaster assembly, each slot connected to the at least one heating chamber. The two slots extend lengthwise between the front and rear surfaces of the first appliance (e.g., such that the longer dimension of the slots extends between the front and rear surfaces). The toaster assembly can include an actuator slidably disposed at one of the side surfaces of the toaster assembly. The first appliance can include a programmable user interface at the front surface of the first appliance. The user interface can be disposed above the door for the second appliance.

Regarding the second appliance (e.g., the toaster oven assembly), in an open position, the door provides access to the heating chamber of the second appliance. The toaster oven assembly can include a baking rack movably disposed within the heating chamber of the second appliance. A width of the backing rack can be dimensioned smaller than a depth of the backing rack. The heating chamber of the second appliance is separated and independent from the at least one heating chamber of the first appliance. The first appliance is usable independently of the second appliance.

In accordance with embodiments of the present disclosure, an exemplary combination appliance is provided. The combination appliance includes a toaster assembly and a toaster oven assembly. The toaster assembly includes a front surface, a rear surface, side surfaces extending between the front and rear surfaces, and at least one heating chamber. The toaster oven assembly includes a front surface, a rear surface, side surfaces extending between the front and rear surfaces, a heating chamber, and a door at the front surface of the toaster oven assembly. The toaster assembly is vertically disposed over the toaster oven assembly with the front, rear and side surfaces of the toaster and toaster oven assemblies substantially aligned. A width of the combination appliance defined by the front surface of the toaster and toaster oven assemblies is dimensioned smaller than a depth of the combination appliance defined by the side surfaces of the toaster and toaster oven assemblies.

The heating chamber of the toaster oven assembly is separated from the at least one heating chamber of the toaster assembly. The toaster assembly is usable independently of the toaster oven assembly. In some embodiments, the depth of the combination appliance is at least two times greater than the width of the combination appliance. The toaster assembly can include two slots formed in a top surface of the toaster assembly, each slot connected to the at least one heating chamber and extending lengthwise between the front and rear surfaces of the toaster assembly.

In accordance with embodiments of the present disclosure, an exemplary method of cooking a foodstuff is provided. The method includes placing the foodstuff within a heating chamber of a combination appliance. The combination appliance includes a first appliance and a second appliance. The first appliance includes a front surface, a rear surface, and side surfaces extending between the front and rear surfaces. The second appliance includes a front surface, a rear surface, side surfaces extending between the front and rear surfaces, and a door at the front surface of the second appliance. The method includes wirelessly connecting to the combination appliance with a remote device. The method includes controlling a cooking operation of the combination appliance with the remote device. The first appliance is vertically disposed over the second appliance with the front, rear and side surfaces of the first and second appliances substantially aligned. A width of the combination appliance defined by the front surface of the first and second appliances is dimensioned smaller than a depth of the combination appliance defined by the side surfaces of the first and second appliances.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed appliance, reference is made to the accompanying figures, wherein.

DESCRIPTION OF EXEMPLARY EMBODIMENTS

Figure 1:
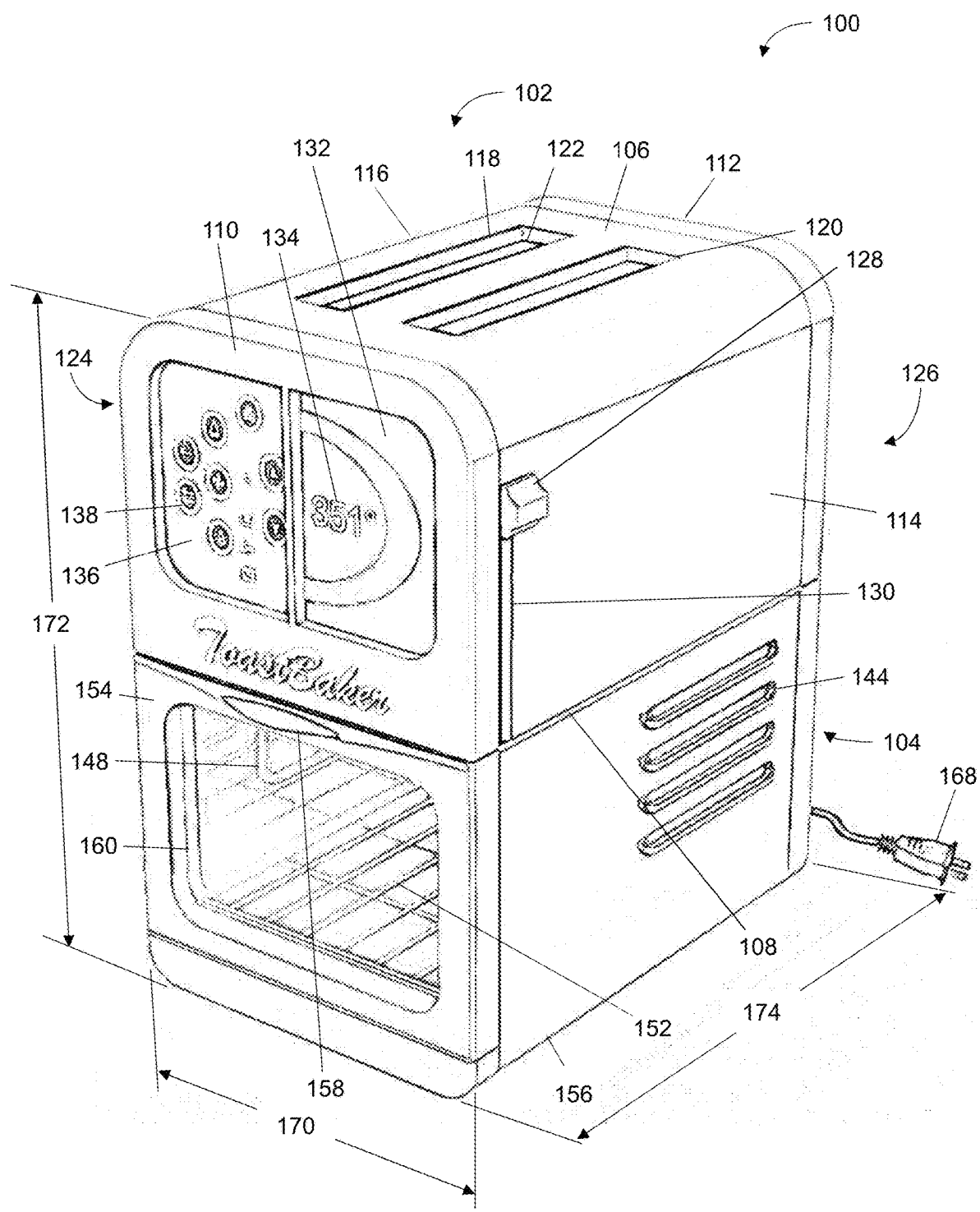
FIG. 1 is a front perspective view of an exemplary appliance according to the present disclosure, with an oven door in a closed position.

In accordance with embodiments of the present disclosure, an exemplary appliance is provided that includes a combination of an electric toaster and a toaster oven. The toaster is stacked vertically over the toaster oven to reduce the overall countertop space needed for the appliance. In addition, the front width of the appliance (as defined by the toaster oven door) is dimensioned smaller than the depth of the appliance, resulting in a reduced need for countertop space in front of the toaster oven. The configuration of the appliance provides space-savings to the user. The heating chambers of the toaster and toaster oven are separated such that each appliance can be independently used. In some embodiments, sensor-based wireless connectivity for monitoring and control of the appliance over a communication interface is provided. In some embodiments, energy-efficient components and functions can be used with the appliance to reduce power consumption.

The combined toaster and toaster oven appliance permits simultaneous toasting of breads and cooking of foods in separate heating chambers that are arranged within a single housing in vertical relationship of fixed height and similar width, each of the heating chambers being provided with respective heating elements. The housing configuration minimizes horizontal countertop space requirements, with the horizontal width of the front and back of the appliance being substantially smaller relative to the depth of the sides. Access to the toaster oven chamber can be achieved through a movably hinged door, and operational controls and informational displays are located on the front of the housing. The interior depth of the toaster oven heating chamber can be considerably greater than the interior width of the toaster oven heating chamber. A combined toaster and toaster oven household appliance where the toaster heating chamber is accessed through slots in the combined appliance roof.

The separate toaster and toaster oven heating chambers can be arranged within a single housing in vertical relationship of fixed height. The horizontal width of the front and back of the appliance can be dimensioned substantially smaller relative to the horizontal depth of the sides. Access to the toaster oven heating chamber can be gained through a movably hinged front door located along the narrower front width, access to the toaster heating chamber can be gained through slots in the housing roof (e.g., top surface), and the appliance occupies a countertop space of horizontal width considerably less than the horizontal depth.

In some embodiments, the appliance can include sensor-based wireless communications abilities, allowing remote monitoring and control of time, cooking, and energy usage functions from a user device via, e.g., a mobile device application. The combination of energy-efficient components and precise cooking management through the remote application provides the means for assuring minimal energy usage when cooking, an important factor in sustainable lifestyles. For example, in the face of current downsizing trends, the growth of small- and tiny-house living, and the increasing numbers of senior- and single-person households, the exemplary appliance provides a more compact toaster and toaster oven combination which necessitates less countertop space, and uses less energy than traditional models.

The exemplary appliance provides a compact combination toaster and toaster oven that utilizes the least amount of lateral countertop area, while providing the capability for simultaneous (and independent) operation of the toaster and toaster oven heating chambers. As compared to a traditional combination toaster/toaster oven appliance or a traditional toaster oven appliance that include a front width having a door, the door and front surface dimensioned greater than the depth of the appliance, the exemplary appliance includes a front surface with a door dimensioned smaller than the depth of the appliance, resulting in reduced lateral countertop space needed to access the heating chamber of the appliance. As a further example, positioning a traditional toaster adjacent to a traditional toaster oven assembly would result in significant lateral countertop space, as compared to the reduced front surface lateral dimensions of the exemplary appliance. The exemplary appliance also provides remote monitoring and control of the toaster oven time and heating functions through wireless communications protocols, and lowers power consumption by use of energy-efficient components and programmed control of time and heating functions via a user interface.

As will be described in greater detail below, the appliance defines a vertically-aligned, combination toaster and toaster oven for heating and cooking foodstuffs. The combination toaster and toaster oven appliance includes a single housing having upper and lower heating chambers. A two-slice toaster heating chamber is located above a compact toaster oven heating chamber, each having distinct and separate heating elements located within the heating chambers for toasting, cooking and heating foodstuffs. In some embodiments, the toaster heating chamber can include access slots wide enough to accommodate bagels or large breads. In some embodiments, the toaster and toaster oven functions can be used simultaneously or separately. By orienting the heating chambers elements in a vertical configuration, the appliance occupies the least countertop area, instead utilizing previously-unused vertical space underneath existing wall cabinets, and/or open space above the appliance.

In some embodiments, touchscreen panels (e.g., a user interface) on the front face display control options and operational status information. In some embodiments, internal sensors can be used to monitor toaster oven and toaster operations, and wireless connectivity to external devices allows for monitoring and control of toaster oven and toaster functions and operations from remote devices (e.g., Android and iOS phones and tablets). In some embodiments, the internal sensors and semi-autonomous monitoring and control of time and heating functions can be used to achieve the least possible energy usage of the appliance throughout heating and cooking operations.

Figure 2:
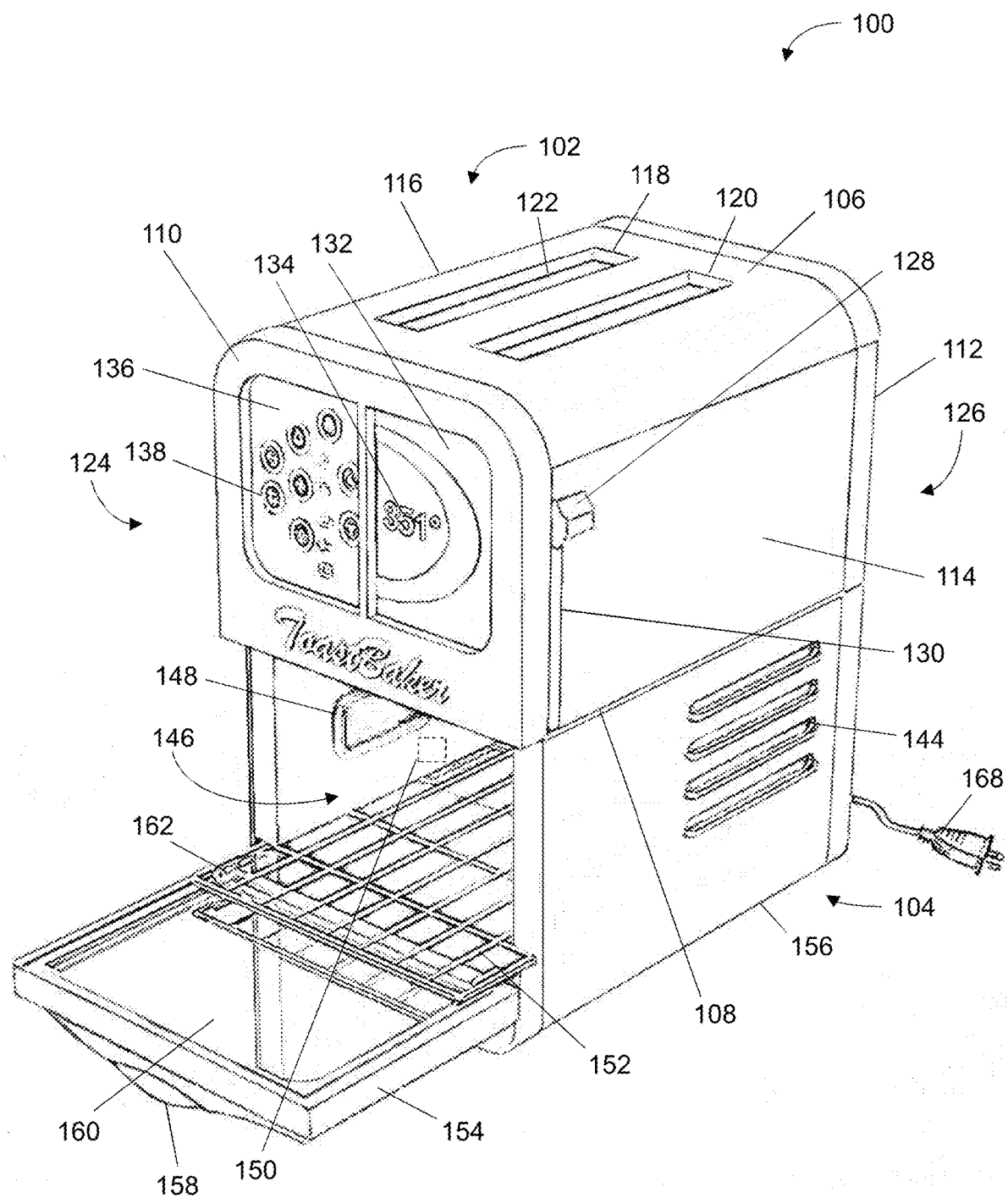
FIG. 2 is a front perspective view of an exemplary appliance according to the present disclosure, with an oven door in an open position.
Figure 3:
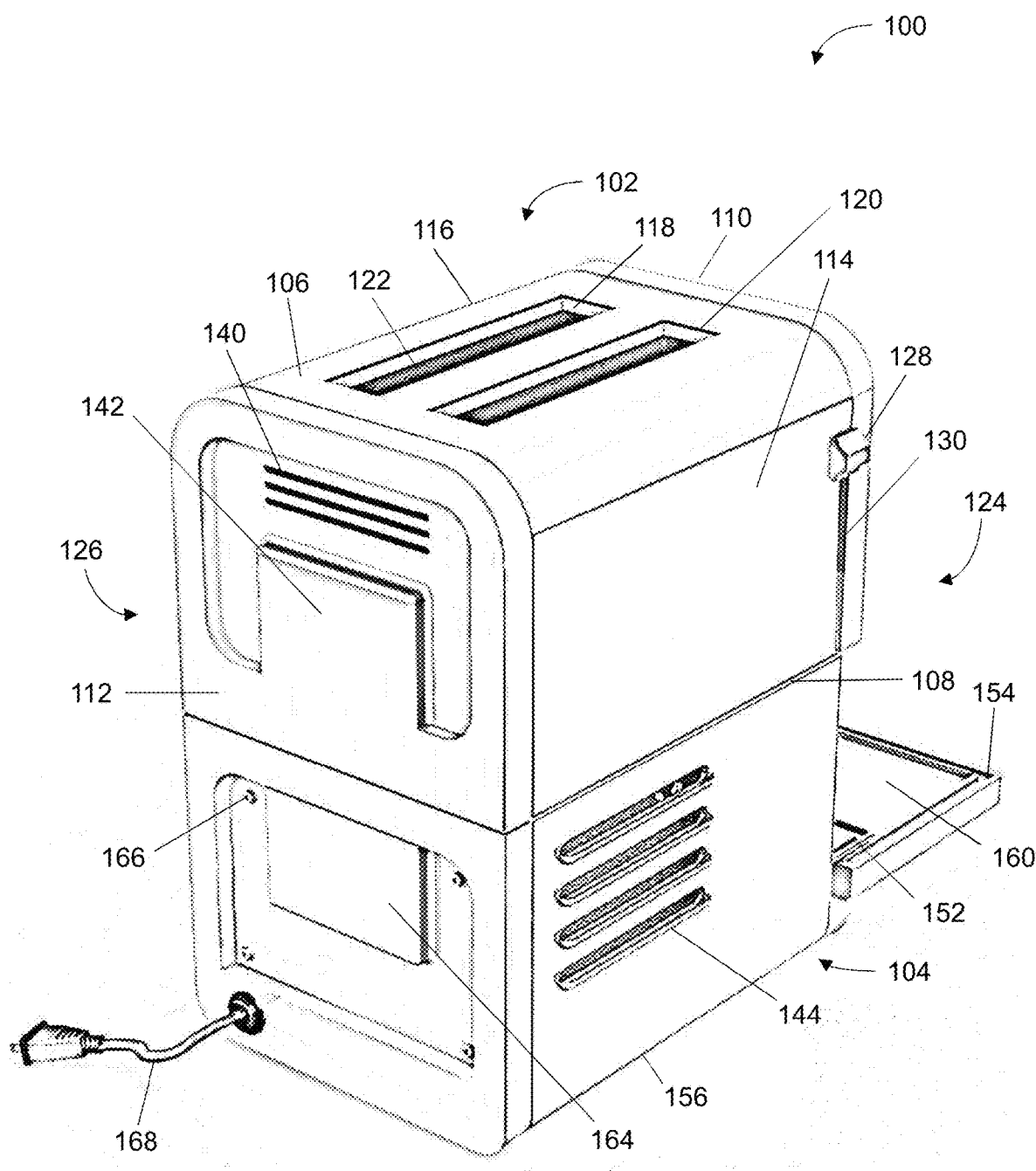
FIG. 3 is a rear perspective view of an exemplary appliance according to the present disclosure, with an oven door in an open position.

FIGS. 1-3 provide front and rear perspective views of an exemplary combination appliance 100 (hereinafter "appliance 100") of the present disclosure. The appliance 100 can be used for cooking, warming, defrosting, baking, or otherwise heating a foodstuff. The appliance 100 includes a toaster assembly 102 (e.g., a first appliance) disposed over and vertically stacked relative to a toaster oven assembly 104 (e.g., a second appliance). The vertical positioning is achieved by placing the bottom of the toaster assembly 102 against the top of the toaster oven assembly 104. The combination of the toaster and toaster oven assemblies 102, 104 is encased in a single housing. The housing can include heat and fire resistant materials to prevent damage to the component of the appliance 100 and/or the surrounding structures.

The toaster assembly 102 includes a top surface 106 that defines the top surface of the appliance 100. A bottom surface 108 of the toaster assembly 102 defines the connection layer between the toaster assembly 102 and the toaster oven assembly 104. In some embodiments, the connection layer can be in the form of an insulative material to restrict heat from the toaster oven assembly 104 reaching the toaster assembly 102. The toaster assembly 102 includes a front surface 110, rear surface 112, and side surfaces 114, 116 defining the front, rear and side surfaces, respectively, of the appliance 100. The front surface 110 defines the proximal end 124 (e.g., front end) of the appliance 100, and the rear surface 112 defines the distal end 126 (e.g., rear end) of the appliance 100. It should be understood that the front, rear and side surfaces 110-116 of the toaster assembly 102 are substantially aligned with and/or shared with the front, rear and side surfaces of the toaster oven assembly 104.

The toaster assembly 102 includes two slots 118, 120 formed in the top surface 106, with openings facing away from the countertop on which the appliance 100 is positioned. Each slot 118, 120 is configured to receive therein, e.g., a slice of break, a bagel slice, or the like. Each slot 118, 120 leads into a heating chamber 122 within the body of the toaster assembly 102. In some embodiments, each slot 118, 120 includes a dedicated heating chamber 122 separated from each other. Although the toaster assembly 102 is illustrated with two slots 118, 120, it should be understood that any number of slots can be used, e.g., one, two, three, four, or the like. In such embodiments, width of the appliance 100 can be dimensioned greater than shown in FIGS. 1-3, resulting in the components of the toaster oven assembly 104 being dimensioned greater (e.g., a larger baking rack and/or tray). The heating chamber 122 includes heating elements for toasting the item placed in the slots 118, 120. The heating elements can be any type of heating device capable of adequately and evenly toasting foodstuffs.

Each heating chamber 122 also includes internal food support cradles attached to lower and lift mechanisms that can be operated manually and/or remotely by an exterior actuator 128. The toaster assembly 102 includes a slot 130 along which the actuator 128 is configured to slide between an off position (e.g., at the top of the slot 130) and an on position (e.g., at the bottom of the slot 130). In some embodiments, the actuator 128 can be controlled by a programmed and/or timed function. The slots 118, 120 extend lengthwise between the proximal and distal ends 124, 126, forming a substantially rectangular configuration.

The front surface 110 of the toaster assembly 102 can include a user interface 132. The user interface 132 can be used to control operation of both the toaster assembly 102 and the toaster oven assembly 104. In some embodiments, the user interface 132 can be used manually to operate the appliance 100. In some embodiments, the user interface 132 can be programmed to operate the appliance 100 in a timed manner. In some embodiments, the user interface 132 can be used to wirelessly communicate with a mobile device (e.g., a remote device, a smart phone) to remotely control operation of the appliance 100. For example, the appliance 100 can be paired with a mobile device of a user over a communication network such that the appliance 100 can be controlled remotely by the mobile device. In such embodiments, the user interface 132 can include a receiver/transmitter for communicating with the mobile device. In some embodiments, at least a portion of the front surface 110 can be fabricated from a metal or composite material. In some embodiments, a logo or name of the appliance 100 can be formed in raised lettering at the front surface 110.

The user interface 132 can include a display 134. The display 134 can provide visual output to the user of the internal temperature of the toaster oven assembly 104. The user interface 132 can include an actuator area 136 having multiple actuators 138 (e.g., depressible buttons). The actuators 138 can be used to control, e.g., on/off, oven temperature, fan speed, heating type, pre-programmed cooking, combinations thereof, or the like. In some embodiments, the user interface 132 and/or the actuator 136 can include illuminated display panels.

In some embodiments, the user interface 132 and/or the actuator area 136 can be in the form of a flat touchscreen panel with illuminated and delineated selector buttons having control over the toaster and toaster oven assembly 102, 104 operations. In some embodiments, the user interface 132 can include a pixel-addressable programmable liquid crystal display (LCD) panel capable of displaying real-time graphics. The rear surface 112 of the toaster assembly 102 can include air exchange slots 140 for maintaining a cool temperature of circuit boards and control electronics disposed behind an insulated housing 142.

Still with reference to FIGS. 1-3, the toaster oven assembly 104 includes front, rear and side surfaces 110-116 extending as continuations from the toaster assembly 102. On one or more of the side surfaces 114, 116, the toaster oven assembly 104 includes air exchange slots 144 for providing air circulation of the heating chamber 146. As noted above, the heating chamber 146 of the toaster oven assembly 104 is separated from the heating chambers 122 of the toaster assembly 104, such that the toaster oven assembly 104 can be used independently from or simultaneously with the toaster assembly 104 (and vice versa).

The heating chamber 146 includes multiple heating elements 148 disposed, e.g., along the side, bottom and top walls, of the heating chamber 146. The heating elements 148 can be any type of heating device capable of adequately heating, warming, baking, broiling or otherwise cooking foodstuffs. The toaster oven assembly 104 includes one or more sensor arrays 150 disposed within the heating chamber 146 and configured to detect and monitor the temperature within the heating chamber 146.

The toaster oven assembly 104 includes one or more movable and removable wire baking racks 152 (e.g., shelves) for supporting foodstuffs to be heated or cooked. Based on the configuration of the toaster oven assembly 104, the width of the baking rack 152 is dimensioned smaller than the depth or length of the backing rack 152. In some embodiments, the toaster over assembly 104 can include a removable tray for receiving foodstuffs to be heated or cooked, the tray being removably disposed over the baking rack 152. The toaster oven assembly 104 includes a door 154 hingedly coupled to the frame of the appliance 100 at or near a bottom surface 156 of the toaster oven assembly 104. The bottom surface 156 defines the bottom surface of the appliance 102.

The door 154 includes an insulated handle 158 and is positionable between a closed position (e.g., FIG. 1) and an open position (e.g., FIG. 2). In the open position, the door 154 provides access to the heating chamber 146 of the toaster oven assembly 104. The door 154 includes an inset glass panel 160 forming a window for visual inspection of the cooking process within the heating chamber 146. In some embodiments, the door 154 can include a coupling mechanism 162 configured to snap around a portion of the baking rack 152 (e.g., via a friction fit) such that opening the door 154 extends the baking rack 152 at least partially out of the heating chamber 146, and closing the door 154 retracts the baking rack 152 back into the heating chamber 146.

The appliance 100 can include various trim elements along the edges of the appliance 100 (e.g., rear and front edges). The trim elements can be formed from heat and fire resistant materials. At the rear surface 112, the toaster oven assembly 104 can include a removable access plate 164 covering and protecting electronics associated with the toaster oven assembly 104. Tamper resistant screws 166 can be used to secure the plate 164 to the housing. The appliance 100 includes a retractable power cord 168 for providing power to the appliance 100. The bottom surface 156 can include multiple feet (e.g., rubber or composite materials) for slightly elevating the appliance 100 over the countertop to reduce undesired movement/sliding of the appliance on the countertop and to provide a heat barrier between the appliance 100 and the countertop.

The width 170 of the appliance 100 is defined by most (if not all) of the door 154 for the toaster oven assembly 104, and is measured as the distance between the side surfaces 114, 116 at the front end 124 or rear end 126 of the appliance 100. The width 170 therefore defines the lateral distance between the side surfaces 114, 116. The height 172 of the appliance 100 is measured between the top and bottom surfaces 106, 156 of the appliance 100, and encompasses both the toaster and toaster oven assemblies 102, 104 stacked in a vertical configuration. The depth 174 of the appliance 100 is measured between the front and rear surfaces 110, 112 and is equal to the length of the side surfaces 114, 116.

The width 170 is dimensioned smaller than the depth 174 (e.g., the door 154 width is dimensioned smaller than the depth 174). In some embodiments, the width 170 can be approximately half of the depth 174. In some embodiments, the width 170 can be approximately three-quarters of the depth 174. In some embodiments, the depth 174 can be approximately 1.47 times greater than the width 170. In some embodiments, the width 170 can be approximately, e.g., 50%, 55%, 60%, 65%, 68%, 70%, 75%, or the like, of the depth 174. In some embodiments, the width 170 can be approximately 7.75 inches, the depth 174 can be approximately 11.375 inches, and the overall height of the appliance 100 can be approximately 13.25 inches. The smaller width 170 of the appliance 100 necessitates a smaller open surface area of the countertop in front of the appliance 100 for opening and closing of the door 154, reducing the burden of having the appliance 100 on a countertop. Specifically, the lateral distance occupied on the countertop by the appliance 100 is significantly smaller than traditional toaster ovens. The width 170 and depth 174 dimensions of the housing further correspond with the dimensions of the heating chamber 146 of the toaster oven assembly 104, with the width of the heating chamber 146 dimensioned smaller than the depth of the heating chamber 146.

Figure 4:
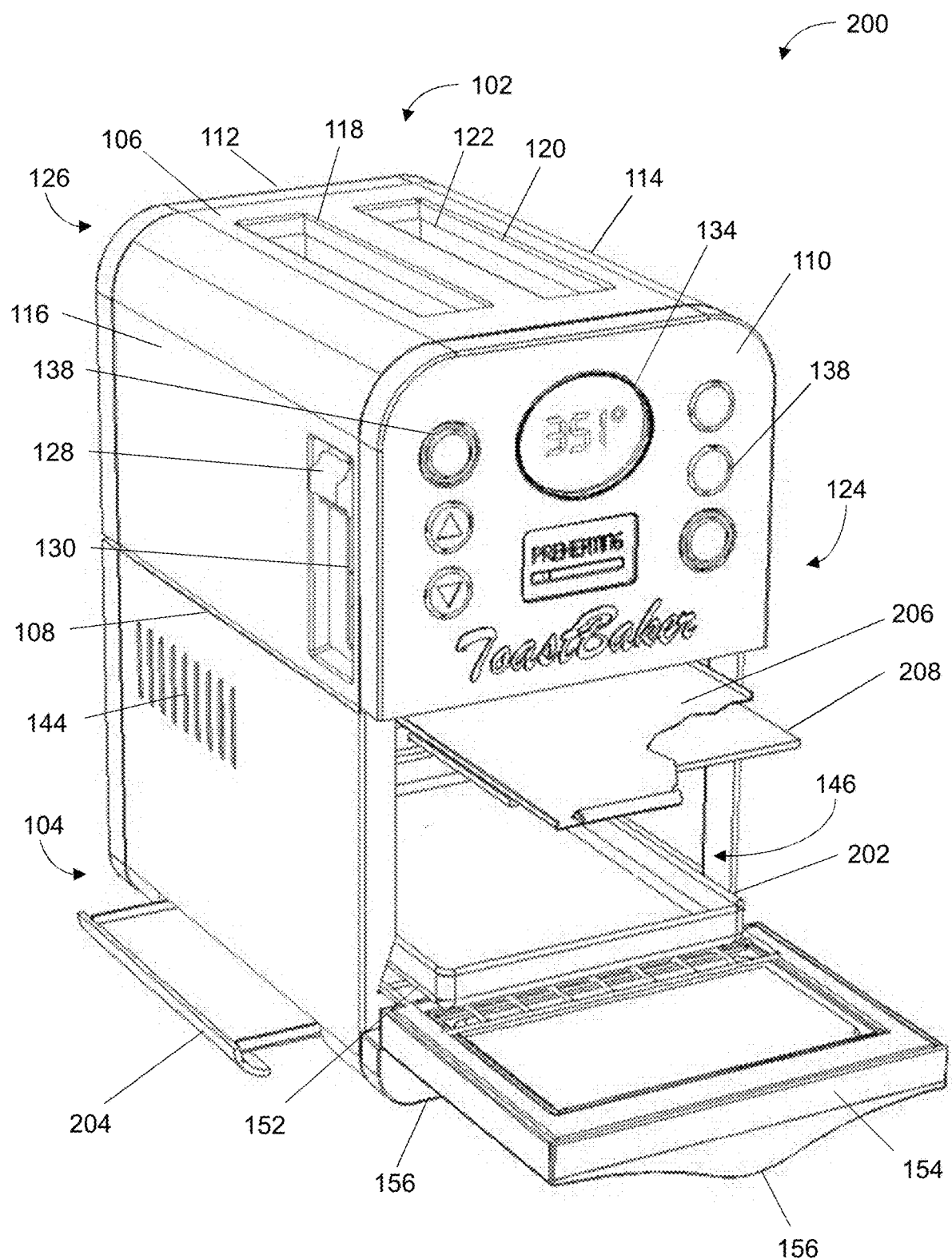
FIG. 4 is a front perspective view of an exemplary appliance according to the present disclosure, with an oven door in an open position, and crumb trays in open positions.

FIG. 4 provides a front perspective view of an exemplary appliance 200 of the present disclosure. The appliance 200 can be substantially similar in structure and function to the appliance 100, except for the distinctions noted herein. Therefore, like reference numbers refer to like structures. The appliance 200 can include a removable baking tray 202 disposed on the backing rack 152. The appliance 200 can include a removable crumb tray 204 for the toasting oven assembly 104. The crumb tray 204 can be slidably disposed at the side surface 116, and can be at least partially removed from the toasting oven assembly 104 via lateral extension. The toaster assembly 102 can include a crumb tray 206 slidably disposed at the front surface 110 directly above the toaster oven assembly 104. An insulating heat shield layer 208 (shown in cutaway view for detail) can be disposed below the crumb tray 206 to provide insulation between the heating chambers 146, 122. In operation, the appliances 100, 200 can be used in a toaster oven mode or toaster mode either simultaneously or individually.

Figure 5:
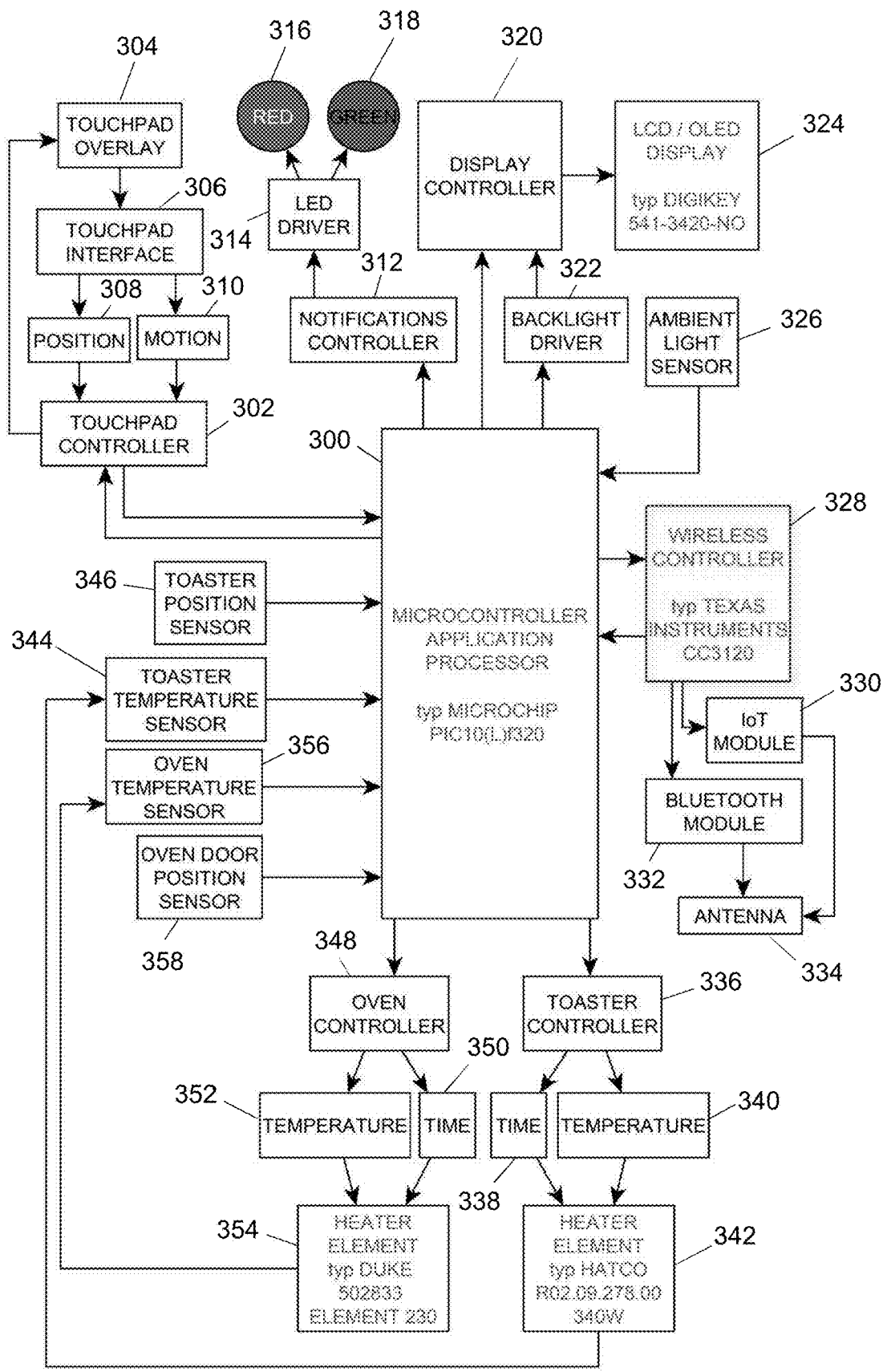
FIG. 5 is a control diagram of an exemplary appliance according to the present disclosure.

FIG. 5 is a block diagram for control of operations of the appliance discussed herein. The appliance includes a controller 300 (e.g., a microcontroller application processor). The controller 300 can be used to receive data as input and output data to control various functions of the appliance. The controller 300 can be in communication with a touchpad controller 302 of a user interface. The touchpad controller 302 can transmit data to a touchpad overlay 304 of the appliance. The touchpad overlay 304 can transmit data to a touchpad interface 306 regarding a position 308 and/or motion 310. The position 308 and/or motion 310 data can be transmitted to the touchpad controller 302.

The user interface of the appliance can include LEDs for notifying the user regarding a status or operation of the appliance. For example, the appliance can include a notifications or alerts controller 312 in communication with the controller 300. Based on data received from the controller 300, the notifications controller 312 can transmit data regarding actuation to an LED driver 314. The LED driver 314, in turn, can actuate either a red 316 or green 318 LED to appropriately notify the user. The controller 300 can be in communication with a display controller 320, and the display controller 320 can operate an LCD/OLED display 324. The appliance can include an ambient light sensor 326 for regulating illumination of components of the appliance. The controller 300 can be in communication with a backlight driver 322 based on data received from the ambient light sensor 326 to regulate illumination of components of the appliance.

In some embodiments, the appliance can be wirelessly controlled via a user device. In such embodiments, the appliance can include a wireless controller 328 in communication with an Internet of Things (IoT) module 330 and/or a Bluetooth module 332. The modules 330, 332 can, in turn, be in communication with an antenna 334 for communication with the user device.

Various sensors and controllers can be used to operate the toaster and toaster oven of the appliance. A toaster controller 336 can be in communication with the controller 300, and can transmit data associated with time 338 (e.g., length of cooking time) and temperature 340 (e.g., temperature setting) to a heater element 342 within the toaster. The time 338 and temperature 340 can be input by the user via an interface. A toaster temperature sensor 344 can be used to monitor and regulate (with the toaster controller 336) the temperature of the toaster during toasting operation. A toaster position sensor 346 can detect and transmit to the controller 300 whether the actuator for toasting is depressed in the "on" position or in the "off" position.

A toaster oven controller 348 can be in communication with the controller 300, and can transmit data associated with time 350 (e.g., length of cooking time) and temperature 352 (e.g., temperature setting) to a heater element 354 within the toaster oven. The time 350 and temperature 352 can be input by the user via an interface. An oven temperature sensor 356 can be used to monitor and regulate (with the toaster oven controller 348) the temperature of the toaster oven during cooking operation. An oven door position sensor 358 can detect whether the door is in the open or closed position.

Figure 6:
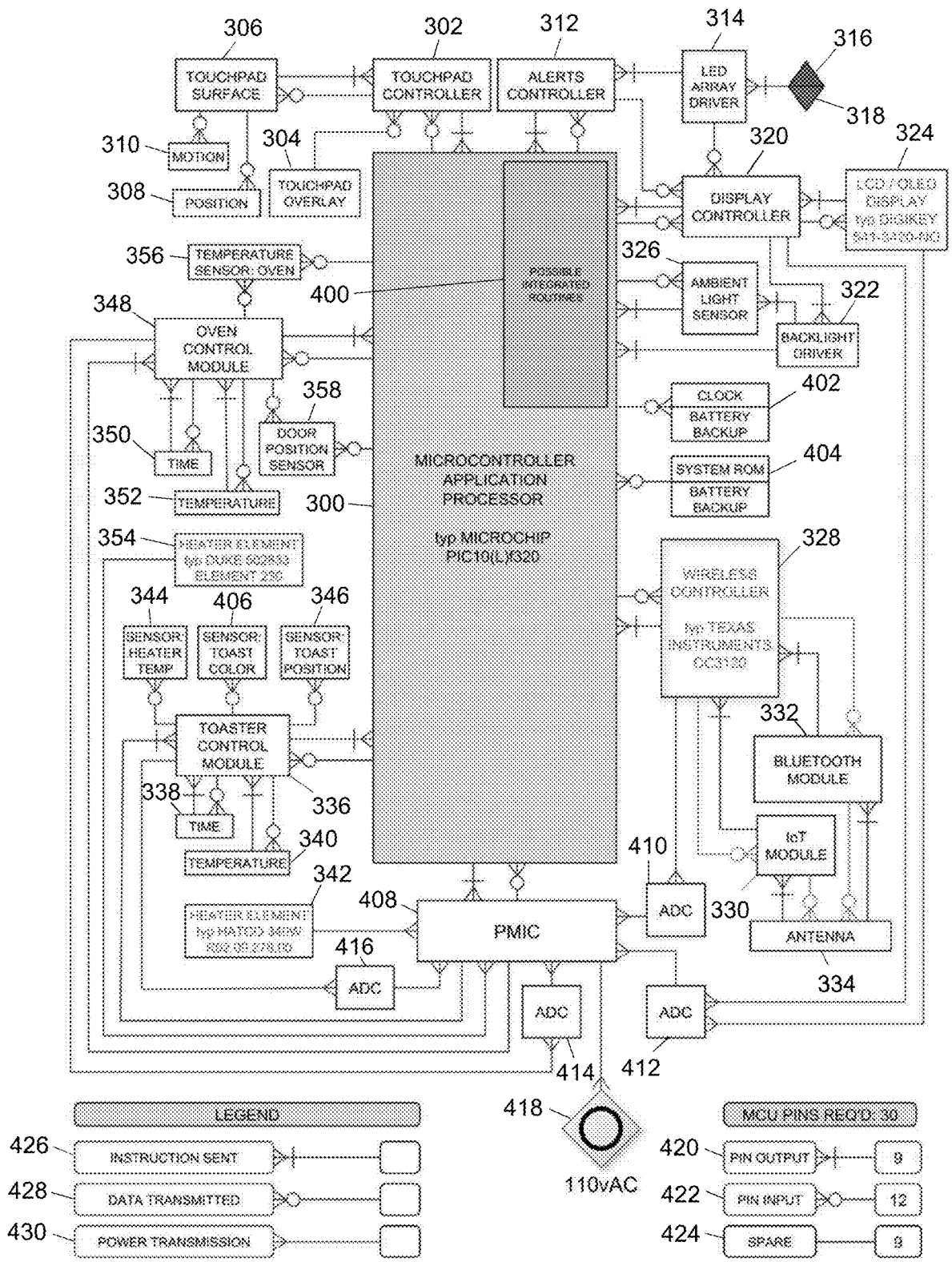
FIG. 6 is a control diagram of an exemplary appliance according to the present disclosure.

FIG. 6 is a block diagram for control of operations of the appliance discussed herein. The components of the block diagram can be substantially similar to those of FIG. 5, except for the distinctions noted herein. Therefore, like reference numbers refer to like structures. The controller 300 can include integrated routines 400 programmed and accessible to the user via the user interface. For example, the integrated routines 400 can include preset cooking times and/or temperatures for different types of foods, defrosting foods, preset toasting times for different types of breads, combinations thereof, or the like.

The appliance can include an internal clock 402 with a battery back-up to maintain and display the time to the user. The appliance can include a system read only memory (ROM) 404 with a battery back-up. The toaster controller 336 can be in communication with a toast color sensor 406 configured to detect the darkness of the toast during operation of the toaster. The appliance can include a power management integrated circuit (PMIC) 408 in communication with the controller 300. Analog-to-digital converters (ADCs) 410-416 can be disposed between the PMIC 408 and controllers of the appliance. An electrical input source 418 can be connected to the PMIC 408. As indicated in the legend, the control diagram includes pin outputs 420, pin inputs 422, and spare pins 424. Element 426 indicates sent instructions or output, element 428 indicates transmitted data, and element 430 indicates power transmission.

Figure 7:
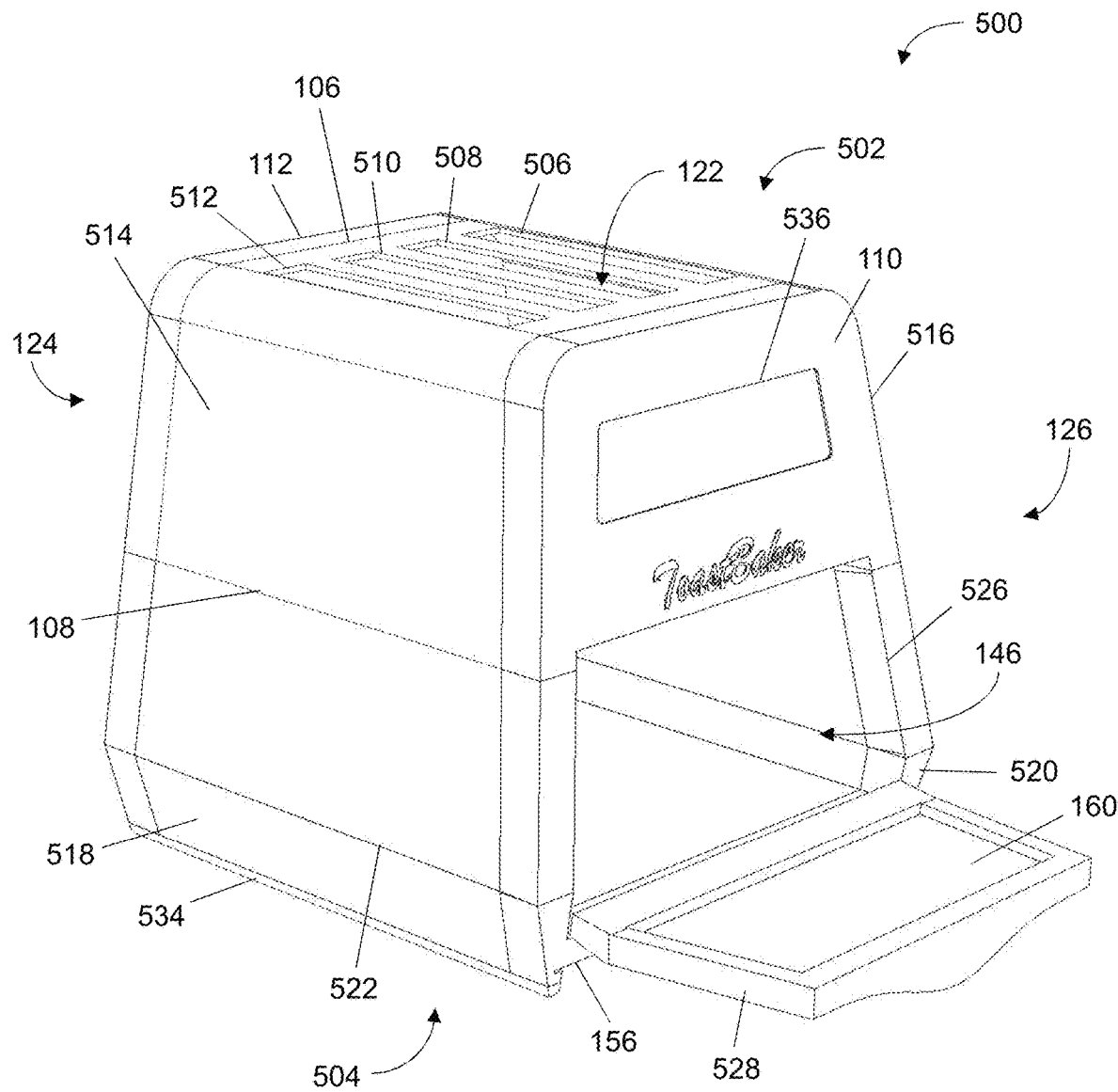
FIG. 7 is a perspective view of an exemplary appliance according to the present disclosure, including a housing with tapered sides.
Figure 8:
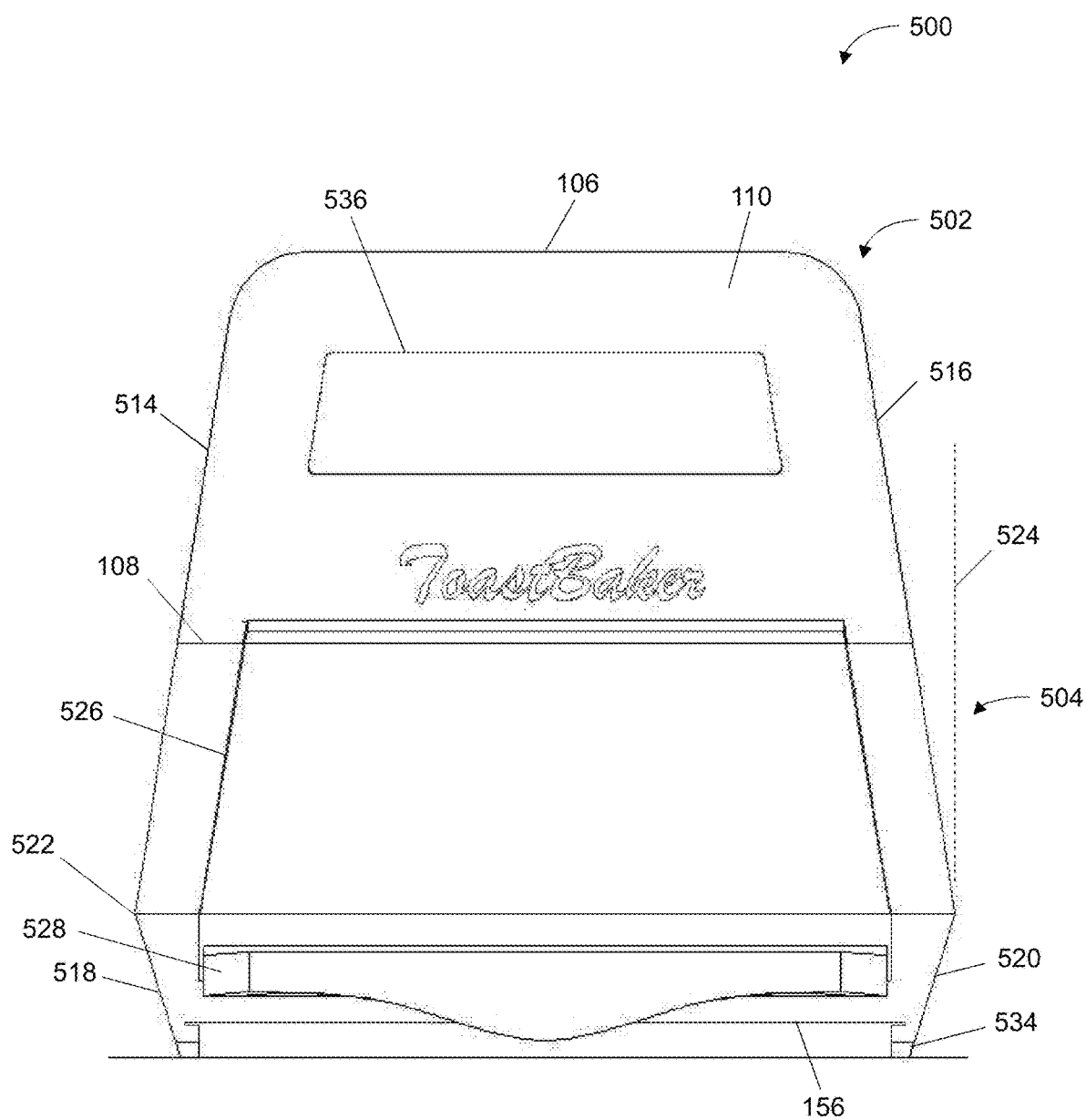
FIG. 8 is a front view of an exemplary appliance according to the present disclosure, including a housing with tapered sides.
Figure 9:
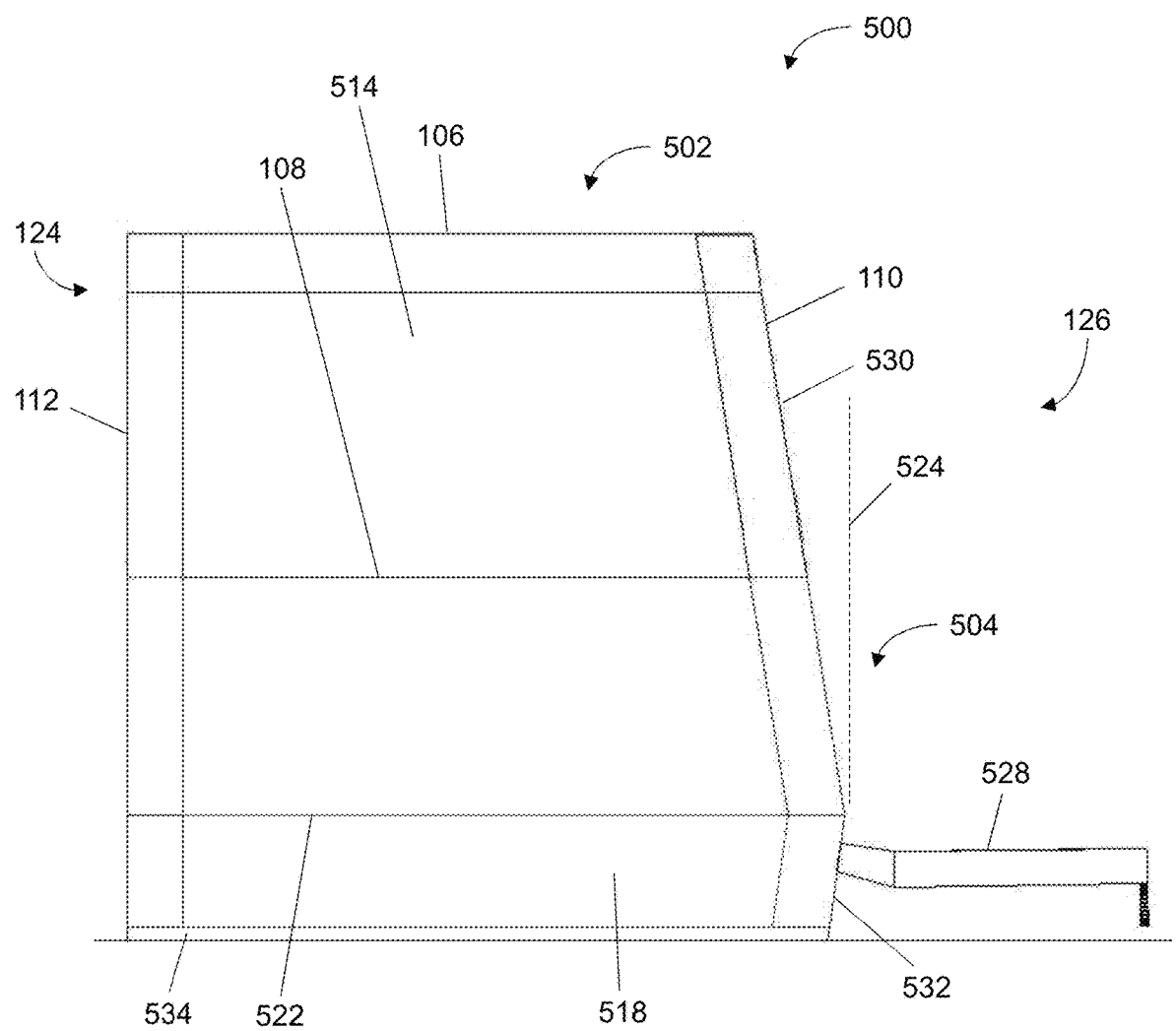
FIG. 9 is a side view of an exemplary appliance according to the present disclosure, including a housing with tapered sides.

FIGS. 7-9 are perspective, front and side views of an exemplary combination appliance 500 (hereinafter "appliance 500") according to the present disclosure. The appliance 500 can be substantially similar in structure and function to the appliance 100. Therefore, like reference numbers refer to like structures. The appliance 500 also includes a toaster assembly 502 and a toaster oven assembly 504. Rather than having two slots 118, 120 for the toaster assembly 502, the top surface 106 can include four slots 506-512 leading into one or more heating chambers 122 within the housing of the toaster assembly 502. An actuator 128 (not visible) can be used to lower and lift individual support cradles into the heating chamber 122 for toasting food.

Rather than having substantially parallel side surfaces and front/rear surfaces, the side and front surfaces of the appliance 500 can be tapered. Each side surface of the appliance 500 can include a top section 514, 516 and a bottom section 518, 520. The top and bottom sections 514-520 connect at an edge 522 that forms a pointed surface from which the respective top and bottom sections 514-520 taper. As shown in FIG. 8, the top and bottom sections 514-520 of the side surfaces are tapered or angled relative to a vertical direction 524 (e.g., a directly substantially perpendicular to horizontal). The top sections 514, 516 taper towards each other such that the width of the appliance 500 at the edge 522 is dimensioned greater than the width of the appliance 500 at the top surface 106. Similarly, the bottom sections 518, 520 taper towards each other such that the width of the appliance 500 at the edge 522 is dimensioned greater than the width of the appliance 500 at the bottom surface 156.

Due to the tapered configuration of the application 500 housing, the opening 526 formed in the housing and leading into the heating chamber 146 of the toaster oven assembly 504 can also include tapered side walls. The door 528 of the toaster oven assembly 504 can also include tapered or angled side walls to correspond with the angled configuration of the housing and opening 526. In some embodiments, as shown in FIG. 9, the front surface 110 of the appliance 500 can include top and bottom sections 530, 532 that also taper or angle away from the vertical direction 524 at the edge 522. The depth of the appliance 500 at the edge 522 is thereby dimensioned greater than the depth of the appliance 500 at the top surface 106, and the depth of the appliance 500 at the edge 522 is also dimensioned greater than the depth of the appliance 500 at the bottom surface 156.

It is noted that the width of the appliance 500 at the edge 522, top surface 106, and bottom surface 156 remains dimensioned smaller than the depth of the appliance 500 at the edge 522, the top surface 106, and the bottom surface 156. In some embodiments, the bottom surface 156 can include supports 534 (e.g., rubber feet) extending the depth of the appliance 500. The appliance 500 includes a user interface 536 for independently (and optionally simultaneously) operating the toaster and toaster oven assemblies 502, 504.

Figure 10A:
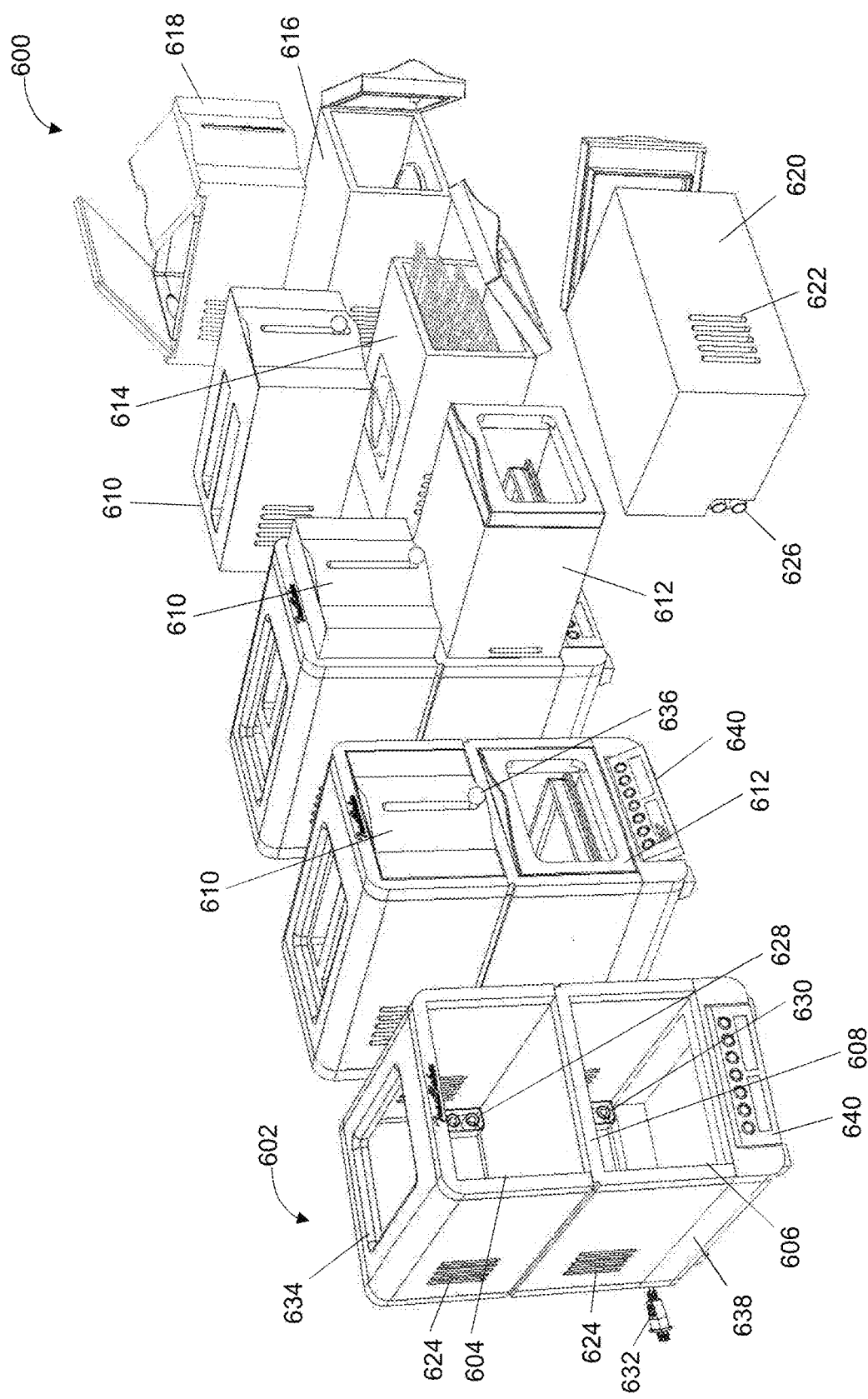
FIGS. 10A and 10B are perspective views of exemplary modular appliances according to the present disclosure.
Figure 10B:
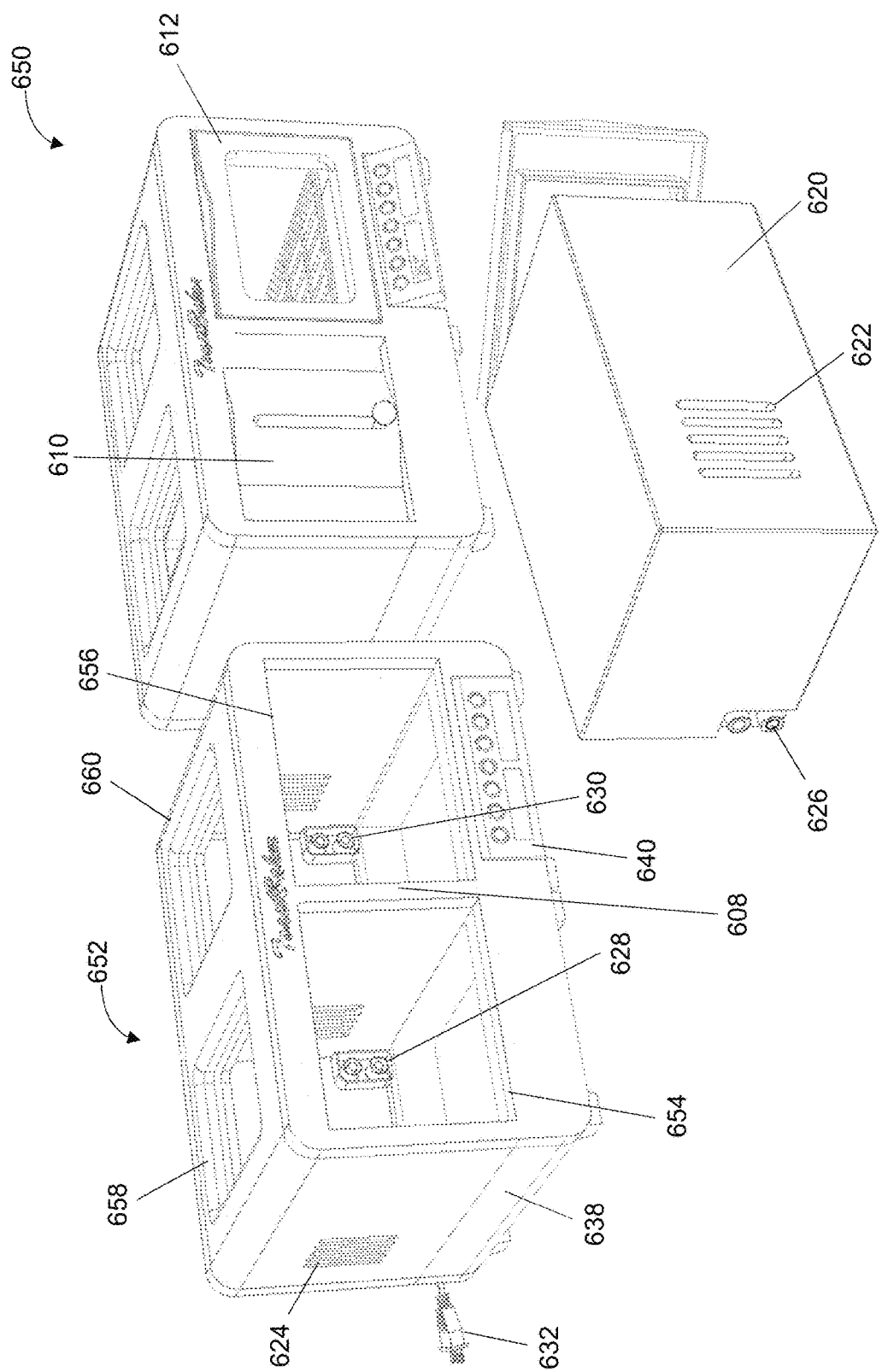

FIGS. 10A and 10B are perspective views of exemplary interchangeable or modular appliances 600, 650 (hereinafter "appliance 600" and "appliance 650") according to the present disclosure. The appliances 600, 650 can be substantially similar in structure and function to the appliances discussed above, except for the distinctions noted herein. Rather than providing a housing with fixed appliances mounted therein, the appliances 600, 650 includes a housing 602, 652 having a modular or interchangeable structure, allowing the user and/or manufacturer to interchange the appliances to be used with the housing 602, 652. A single housing 602, 652 can therefore be used for two different (or the same) interchangeable appliances.

With reference to FIG. 10A, the housing 602 allows for two interchangeable appliances to be vertically oriented relative to each other. The housing 602 includes a front surface with a first bay or opening 604 and a second bay or opening 606. The opening 604 is positioned directly above (e.g., vertically stacked) relative to the opening 606, and is separated from the opening 606 by a divider 608. In some embodiments, the divider 608 can include one or more insulation layers. Each opening 604, 606 leads into a respective cavity configured and dimensioned to removably receive therein an interchangeable appliance (e.g., a toaster 610, a toaster oven 612, a dehydrator 614, a microwave 616, a bread maker 618, or the like). The cavities are dimensioned substantially equally such that any appliance can be inserted into the first or section opening 604, 606.

Each appliance includes an operational assembly within a housing 620, including internal components for cooking one or more food items, and electronics for operation of the appliance. In some embodiments, one or more portions of the housing 602 can include electrical and data circuitry for powering the individual applications (e.g., modules) and communicating with remote devices. In some embodiments, half of the insulation needed for safe operation of the appliances can be incorporated into the housing 602, and half of the insulation can be incorporated into the individual housing 620 of each appliance.

Each appliance includes air exchange slots 622 on one or both side surfaces of the housing 620 for providing air circulation of the heating chamber and/or electronics. The housing 602 includes complementary air exchange slots 624 on the side surfaces for each cavity (e.g., two air exchange slots 624 on the bottom and two air exchange slots 624 on the top) that align with the air exchange slots 622 of the appliance when the appliance is inserted into the housing 602.

Each appliance includes a connector 626 at the rear surface (e.g., the bottom right corner of the rear surface). The housing 602 includes a complementary connector 628, 630 within the top and bottom cavities. During insertion of the appliance into a cavity of the housing 602, the connectors 626-630 can electronically couple, and a power cord 632 connected to an energy source and provide power to the appliance. As shown in the various configurations of FIG. 10, the appliances can be slid in and out of the housing 602. In some embodiments, a physical detect and audible click can be used to ensure connection of each housing 620 with the housing 602.

In some embodiments, the interior volume of each appliance can be approximately 235 cubic inches (e.g., about 4.125 inches in height, about 6 inches in width, and about 9.75 inches in depth). In some embodiments, the dehydrator 614 can include four interior trays and a fan at the top surface of the housing 620. In some embodiments, the microwave 616 can include a rotating turntable. In some embodiments, the bread maker 618 can include an approximately 21 cubic inch loaf pan volume.

The top surface of the housing 602 can include an opening 634 extending into the top cavity of the housing 602. The opening 634 correspond with the slots of the toaster 610 such that when the toaster 610 is inserted into the opening 604, bread slides can be passed through the opening 634 and into the slots of the toaster 610. An actuator 636 at the front of the toaster 610 can be used to lower the inner cradles and operate the toaster 610. The dehydrator 614 can also be inserted into the top bay or opening 604 to align the vent fan with the opening 634.

The housing 602 includes a base 638 disposed below the opening 606. The front surface of the base 638 can include a control panel or user interface 640 for operating the appliances inserted into the housing 602. In some embodiments, the user interface 640 can be in an "off" position when flush with the front surface of the housing, and can be rotated outwardly along a pivot axis to turn the user interface 640 and appliance 600 "on" (see, e.g., leftmost and second from left positions of user interface 640). In some embodiments, pivoting the user interface 640 outwards away from the housing 602 can turn on power and/or data connections to each of the respective housing bays, and provides an adjustable viewing angle of the user interface 640.

The appliance 600 thereby allows for any interchangeable appliance to be inserted into the housing 602, with a single user interface 640 being implemented to operate the appliances. The dimensional relationship between the width and depth of the appliance 600 remains similar to the appliances described herein, reducing the overall surface area necessitated on the countertop in front of the appliance 600.

The appliance 650 of FIG. 10B can be substantially similar to the appliance 600. However, rather than vertically orienting the interchangeable appliances, the housing 652 of appliance 650 includes openings or bays 654, 656 disposed adjacent to each other in a side-by-side relationship (e.g., horizontally oriented). The top surface of the housing 652 includes adjacently disposed openings 658, 660 corresponding with the respective bays 654, 656 to allow for top-loading appliances to be used. Any combination of appliances, as chosen by the manufacturer and/or user, can thereby be implemented in the same housing 652.

Figure 11:
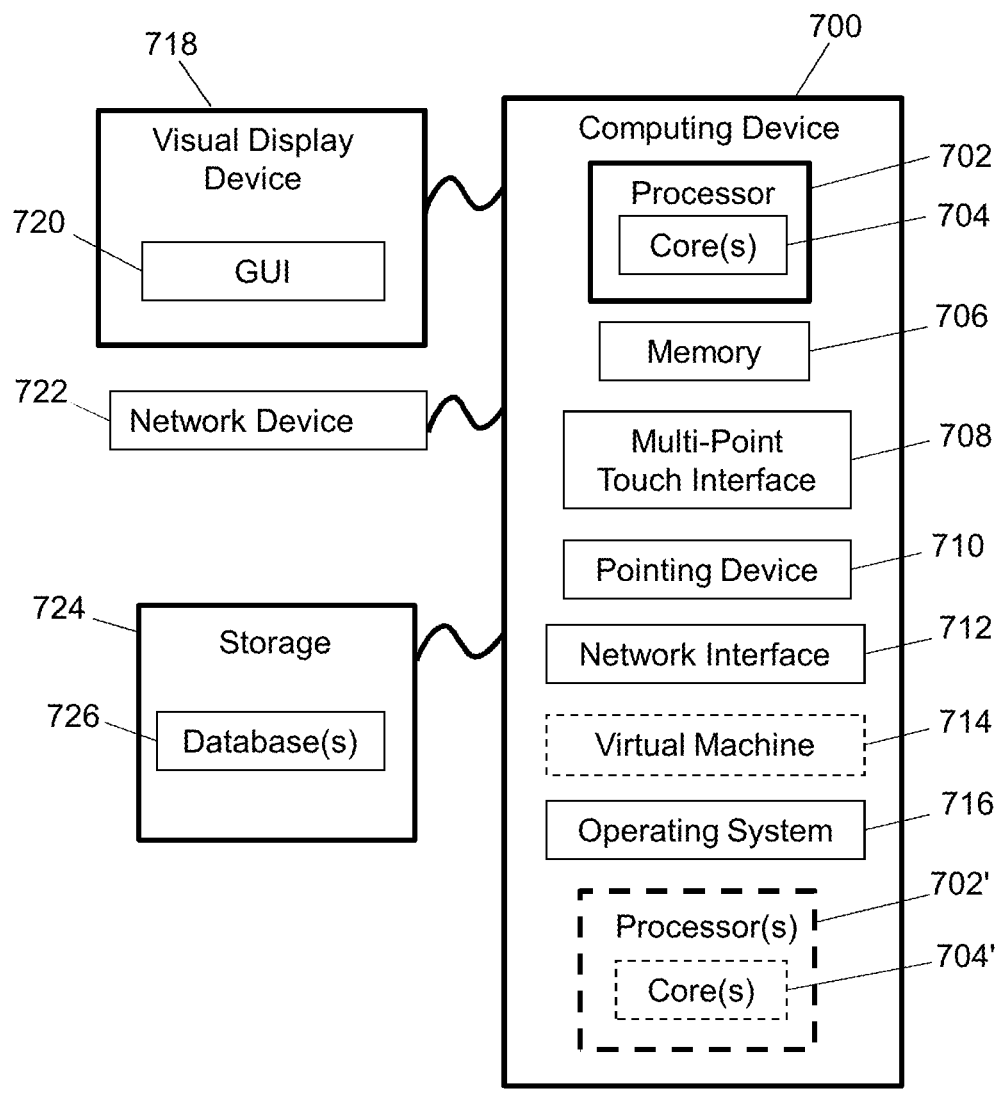
FIG. 11 is a block diagram of a computing device according to the present disclosure.

FIG. 11 is a block diagram of a computing device 700 in accordance with exemplary embodiments of the present disclosure. The computing device 700 can be integrated into the appliance or can be paired or connected to the appliance to remotely control one or more operations of the appliance. The computing device 700 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 706 included in the computing device 700 may store computer-readable and computer-executable instructions or software for implementing exemplary embodiments of the present disclosure (e.g., instructions for controlling one or more portions of the appliance). The computing device 700 also includes configurable and/or programmable processor 702 and associated core 704, and optionally, one or more additional configurable and/or programmable processor(s) 702' and associated core(s) 704' (for example, in the case of computer systems having multiple processors/cores), for executing computer-readable and computer-executable instructions or software stored in the memory 706 and other programs for controlling system hardware. Processor 702 and processor(s) 702' may each be a single core processor or multiple core (704 and 704') processor.

Virtualization may be employed in the computing device 700 so that infrastructure and resources in the computing device 700 may be shared dynamically. A virtual machine 714 may be provided to handle a process running on multiple processors so that the process appears to be using only one computing resource rather than multiple computing resources. Multiple virtual machines may also be used with one processor.

Memory 706 may include a computer system memory or random access memory, such as DRAM, SRAM, EDO RAM, and the like. Memory 706 may include other types of memory as well, or combinations thereof.

A user may interact with the computing device 700 through a visual display device 718 (e.g., a remote device, a personal computer, a mobile smart device, or the like), such as a computer monitor, which may display one or more user interfaces 720 that may be provided in accordance with exemplary embodiments. The computing device 700 may include other I/O devices for receiving input from a user, for example, a keyboard or any suitable multi-point touch interface 708, a pointing device 710 (e.g., a mouse), a touchscreen, individual buttons, or the like. The input device(s) may be coupled to the visual display device 718. The computing device 700 may include other suitable conventional I/O peripherals.

The computing device 700 may also include one or more storage devices 724, such as a hard-drive, CD-ROM, or other computer readable media, for storing data and computer-readable instructions and/or software that implement exemplary embodiments of the appliance described herein. Exemplary storage device 724 may also store one or more databases 726 for storing any suitable information required to implement exemplary embodiments. For example, exemplary storage device 724 can store one or more databases 726 for storing information, such as data relating to operation of the toaster oven, data relating to operation of the toaster, data relating to operation of a modular appliance, and computer-readable instructions and/or software that implement exemplary embodiments described herein. The databases 726 may be updated by manually or automatically at any suitable time to add, delete, and/or update one or more items in the databases.

The computing device 700 can include a network interface 712 configured to interface via one or more network devices 722 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 712 may include a built-in network adapter, network interface card, PCMCIA network card, card bus network adapter, wireless network adapter, USB network adapter, modem or any other device suitable for interfacing the computing device 700 to any type of network capable of communication and performing the operations described herein. Moreover, the computing device 700 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 700 may run any operating system 716, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 716 may be run in native mode or emulated mode. In an exemplary embodiment, the operating system 716 may be run on one or more cloud machine instances.

Figure 12:
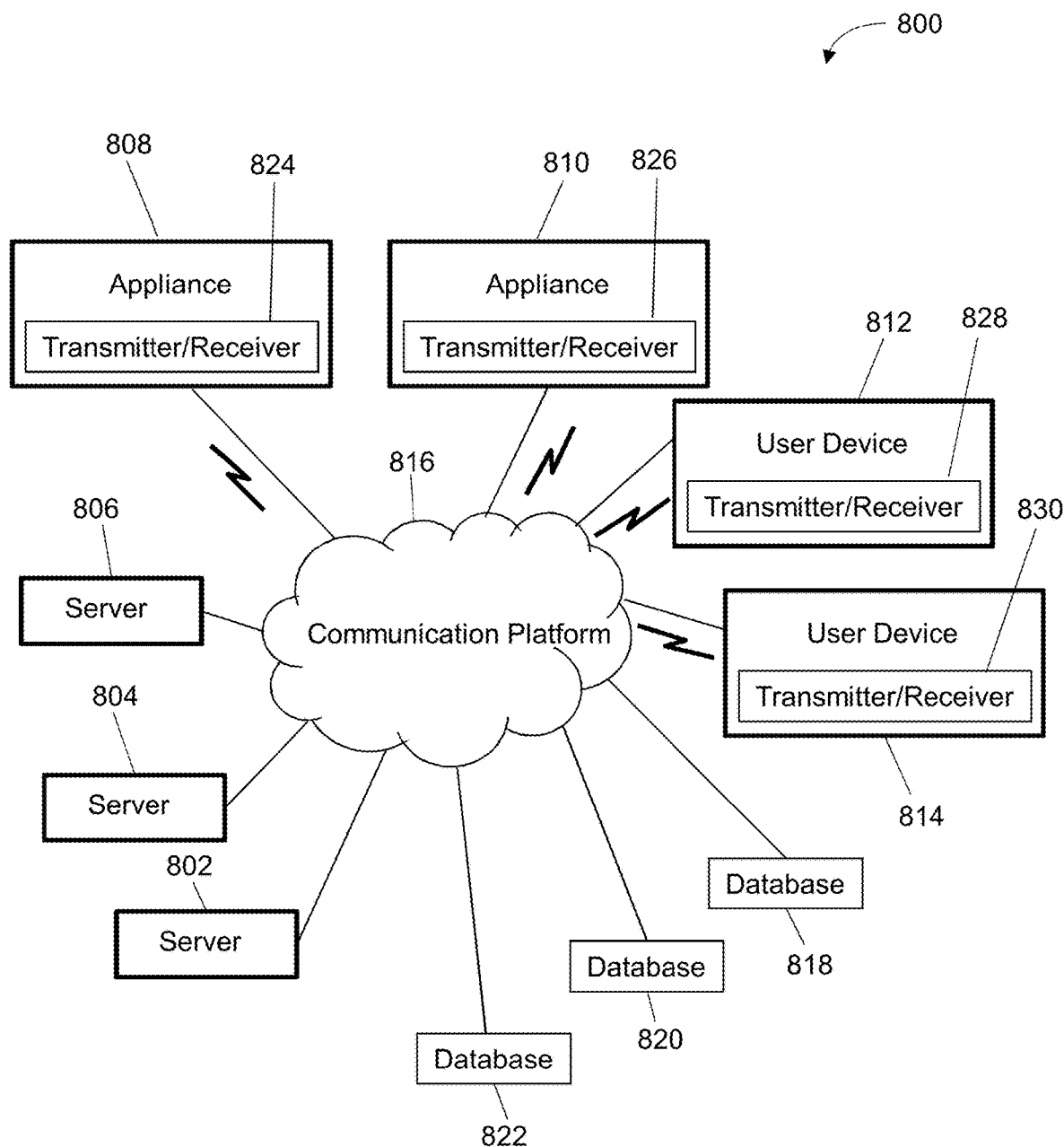
FIG. 12 is a block diagram of an appliance environment according to the present disclosure.

FIG. 12 is a block diagram of an exemplary appliance environment 800 in accordance with exemplary embodiments of the present disclosure. The environment 800 can include servers 802, 804, 806 operatively coupled to one or more appliances 808, 810 and user devices 812, 814, via a communication platform 816, which can be any network over which information can be transmitted between devices communicatively coupled to the network. For example, the communication platform 816 can be the Internet, Intranet, virtual private network (VPN), wide area network (WAN), local area network (LAN), and the like. In some embodiments, the communication platform 816 can be part of a cloud environment. The appliances 808, 810 and user devices 812, 814 can each include a transmitter/receiver 824-830 for transmitting data to each other over the communication platform 816. The environment 800 can include repositories or databases 818, 820, 822, which can be operatively coupled to the servers 802, 804, 806, as well as to the one or more appliances 808, 810 and user devices 812, 814, via the communications platform 816. In exemplary embodiments, the servers 802, 804, 806, appliances 808, 810 and user devices 812, 814, and databases 818, 820, 822 can be implemented as computing devices (e.g., computing device 700). Those skilled in the art will recognize that the databases 818, 820, 822 can be incorporated into one or more of the servers 802, 804, 806 such that one or more of the servers 802, 804, 806 can include databases 818, 820, 822. In some embodiments, embodiments of the servers 802, 804, 806 can be configured to implement one or more portions of the appliance.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A combination appliance, comprising:
  a portable housing including a first opening formed in the portable housing and a second opening formed in the portable housing, the first opening leading into a first cavity formed within the portable housing, and the second opening leading into a second cavity formed within the portable housing;
  a first appliance including a front surface, a rear surface, side surfaces extending between the front and rear surfaces, and at least one heating chamber, the first appliance inserted into the first cavity of the housing through the first opening; and a second appliance including a front surface, a rear surface, side surfaces extending between the front and rear surfaces, a heating chamber, and a door at the front surface of the second appliance, the second appliance inserted into the second cavity of the portable housing through the second opening;

wherein the first appliance and the second appliance are independently removable from the first and second cavities of the portable housing;

wherein the first appliance is vertically disposed over the second appliance with the front, rear and side surfaces of the first and second appliances aligned;

wherein a width of the combination appliance defined by the front surface of the first and second appliances is dimensioned smaller than a depth of the combination appliance defined by the side surfaces of the first and second appliances;

wherein the combination appliance is configured to be positioned on a countertop;

wherein (i) the first appliance includes a first electrical connector, (ii) the second appliance includes a second electrical connector, (iii) the portable housing includes a third electrical connector inside the first cavity, the first electrical connector is configured to automatically align with and electrically and mechanically couple with the third electrical connector of the portable housing upon insertion of the first appliance into the first cavity, (iv) the portable housing includes a fourth electrical connector inside the second cavity, the second electrical connector is configured to automatically align with and electrically and mechanically couple with the fourth electrical connector of the portable housing upon insertion of the second appliance into the second cavity, and (v) the portable housing includes a single power cord configured to simultaneously provide power to the first appliance through the third connector and provide power to the second appliance through the fourth connector; and wherein the portable housing includes a user interface configured for operating at least one of the first appliance or the second appliance inserted into the portable housing.

2. The combination appliance of claim 1, wherein the first appliance is a toaster assembly, and the second appliance is a toaster oven assembly.

3. The combination appliance of claim 1, wherein the width of the combination appliance is between about half to about three-quarters size of the depth of the combination appliance.

4. The combination appliance of claim 2, wherein the toaster assembly includes two slots formed in a top surface of the toaster assembly, each slot connected to the at least one heating chamber.

5. The combination appliance of claim 4, wherein the two slots extend lengthwise between the front and rear surfaces of the first appliance.

6. The combination appliance of claim 2, wherein the toaster assembly includes an actuator slidably disposed at the front surface of the toaster assembly.

7. The combination appliance of claim 1, wherein in an open position, the door provides access to the heating chamber of the second appliance.

8. The combination appliance of claim 2, wherein the toaster oven assembly includes a baking rack movably disposed within the heating chamber of the second appliance.

9. The combination appliance of claim 8, wherein a width of the backing rack is dimensioned smaller than a depth of the backing rack.

10. The combination appliance of claim 1, wherein the heating chamber of the second appliance is separated from the at least one heating chamber of the first appliance.

11. The combination appliance of claim 1, wherein the first appliance is usable independently of the second appliance.

12. A method of cooking a foodstuff, comprising:

placing the foodstuff within a heating chamber of a combination appliance, the combination appliance comprising:

a portable housing including a first opening formed in the portable housing and a second opening formed in the portable housing, the first opening leading into a first cavity formed within the portable housing, and the second opening leading into a second cavity formed within the portable housing;

a first appliance including a front surface, a rear surface, and side surfaces extending between the front and rear surfaces, the first appliance inserted into the first cavity of the portable housing through the first opening; and a second appliance including a front surface, a rear surface, side surfaces extending between the front and rear surfaces, and a door at the front surface of the second appliance, the second appliance inserted into the second cavity of the portable housing through the second opening;

wherein the first appliance and the second appliance are independently removable from the first and second cavities of the portable housing;

wherein the first appliance is vertically disposed over the second appliance with the front, rear and side surfaces of the first and second appliances aligned;

wherein a width of the combination appliance defined by the front surface of the first and second appliances is dimensioned smaller than a depth of the combination appliance defined by the side surfaces of the first and second appliances;

wherein the combination appliance is configured to be positioned on a countertop; and wherein (i) the first appliance includes a first electrical connector, (ii) the second appliance includes a second electrical connector, (iii) the portable housing includes a third electrical connector inside the first cavity, the first electrical connector is configured to automatically align with and electrically and mechanically couple with the third electrical connector of the portable housing upon insertion of the first appliance into the first cavity, (iv) the portable housing includes a fourth electrical connector inside the second cavity, the second electrical connector is configured to automatically align with and electrically and mechanically couple with the fourth electrical connector of the portable housing upon insertion of the second appliance into the second cavity, and (v) the portable housing includes a single power cord configured to simultaneously provide power to the first appliance through the third connector and provide power to the second appliance through the fourth connector; and wherein the portable housing includes a user interface configured for operating at least one of the first appliance or the second appliance inserted into the portable housing; and controlling a cooking operation of at least one of the first appliance or the second appliance with the user interface.

13. The combination appliance of claim 1, wherein:

upon insertion of the first appliance into the first cavity, the side surfaces of the first appliance are surrounded by the portable housing; and upon insertion of the second appliance into the second cavity, the side surfaces of the second appliance are surrounded by the portable housing.

14. A combination appliance, comprising:

a portable housing including a first opening formed in the portable housing and a second opening formed in the portable housing, the first opening leading into a first cavity formed within the portable housing, and the second opening leading into a second cavity formed within the portable housing;

a first appliance including a front surface, a rear surface, side surfaces extending between the front and rear surfaces, and at least one heating chamber, the first appliance inserted into the first cavity of the portable housing through the first opening; and a second appliance including a front surface, a rear surface, side surfaces extending between the front and rear surfaces, a heating chamber, and a door at the front surface of the second appliance, the second appliance inserted into the second cavity of the portable housing through the second opening;

wherein the first appliance and the second appliance are independently removable from the first and second cavities of the portable housing;

wherein the first appliance is vertically disposed over the second appliance;

wherein the combination appliance is configured to be positioned on a countertop; and wherein (i) the first appliance includes a first electrical connector, (ii) the second appliance includes a second electrical connector, (iii) the portable housing includes a third electrical connector inside the first cavity, the first electrical connector is configured to automatically align with and electrically and mechanically couple with the third electrical connector of the portable housing upon insertion of the first appliance into the first cavity, (iv) the portable housing includes a fourth electrical connector inside the second cavity, the second electrical connector is configured to automatically align with and electrically and mechanically couple with the fourth electrical connector of the portable housing upon insertion of the second appliance into the second cavity, and (v) the portable housing includes a single power cord configured to simultaneously provide power to the first appliance through the third connector and provide power to the second appliance through the fourth connector; and wherein the portable housing includes a user interface configured for operating at least one of the first appliance or the second appliance inserted into the portable housing.

15. The combination appliance of claim 14, wherein the first appliance is vertically disposed over the second appliance with the front, rear and side surface of the first and second appliances aligned.

16. The combination appliance of claim 1, wherein the first cavity of the housing and the second cavity of the housing are dimensioned equally, and the first and second appliances are dimensioned equally, such that both the first appliance and the second appliance are capable of being interchangeably inserted into the first and second cavities through the respective first and second openings and tightly fixed or secured inside of the first and second cavities.

* * * * *